United States Patent [19]

Grimble et al.

[11] Patent Number: 5,038,269
[45] Date of Patent: Aug. 6, 1991

[54] INDUSTRIAL CONTROL SYSTEMS

[75] Inventors: Michael J. Grimble, Bridge of Weir; Niall A. Fairbairn, Thornliebank, both of Scotland

[73] Assignee: National Research Development Corporation, London, England

[21] Appl. No.: 317,454

[22] PCT Filed: Nov. 25, 1988

[86] PCT No.: PCT/GB88/01024

§ 371 Date: Feb. 14, 1989

§ 102(e) Date: Feb. 14, 1989

[87] PCT Pub. No.: WO89/05002

PCT Pub. Date: Jun. 1, 1989

[30] Foreign Application Priority Data

Nov. 25, 1987 [GB] United Kingdom ............... 8727602

[51] Int. Cl.$^5$ .............................................. G05B 13/02
[52] U.S. Cl. ..................................... 364/148; 364/151
[58] Field of Search ............... 364/148, 149, 150, 151, 364/152–166

[56] References Cited

U.S. PATENT DOCUMENTS

| | | | |
|---|---|---|---|
| 4,578,747 | 3/1986 | Hideg et al. | 364/151 |
| 4,639,853 | 1/1987 | Rake et al. | 364/149 |
| 4,641,235 | 2/1987 | Shigemasa et al. | 364/149 |
| 4,674,028 | 6/1987 | Shioya et al. | 364/157 |
| 4,774,667 | 9/1988 | Kuraoka et al. | 364/150 |
| 4,791,548 | 12/1988 | Toshikawa | 364/149 |
| 4,879,643 | 11/1989 | Chakravavty et al. | 364/148 |
| 4,882,526 | 11/1989 | Iino et al. | 364/150 |

FOREIGN PATENT DOCUMENTS 0087974 7/1983 United Kingdom.

OTHER PUBLICATIONS

International Journal of Control vol. 46, No. 4, Oct. 1987, Grimble, N.J.:"Infinity Robust Controller for Self-Tuning Control", pp. 1429–1444.
M. J. Grimble, "Infinity Robust Controller for Self-Tuning Control Applications, Part 2, Self-Tuning and Robustness", International Journal of Control, vol. 46, No. 5, Nov. 1987, pp. 1819–1840.
Hwang et al., "Adaptive Control of Optimal Model Matching in H-Infinity-Norm Space", IEEE Proceedings, vol. 135, No. 4, Jul. 1988, pp. 295–301.

Primary Examiner—Jerry Smith
Assistant Examiner—Jim Trammell
Attorney, Agent, or Firm—Cushman, Darby & Cushman

[57] ABSTRACT

An adaptive H∞ industrial control system has a controller 21 controlling an industrial process 20 (ship, rolling mill, etc.), the state of which is measured (y). The controller and process outputs are fed to a parameter estimator 34 which estimates the operating polynomials (transfer functions or delay operator functions) A, B, and C of the process. A controller design unit 35 processes the output of estimator 34 to produce coefficients for the controller 21, which implements a polynomial ratio $C_n/C_d$. The H∞ algorithm is based on minimizing a "square of sum" form of function $(P_c \cdot u(t) + F_c \cdot e(t))^2$, which results in equations which are easier to solve than those arising from the usual "sum of squares" form of function. A polynomial $$L = P_{cn}F_{cd}B - F_{cn}P_{cd}A$$

is calculated, the unstable zeros $L_-$ are calculated, the matrix equations $$FAP_{cd}\lambda + L_-G = P_{cn}CF^*z^{-n}$$

$$FBF_{cd}\lambda - L_-H = F_{cn}CF^*z^{-n}$$

are calculated, the extreme eigenvalue extracted, the corresponding eigenvector extracted, and $C_n$ and $C_d$ calculated as $GF_{cd}$ and $HP_{cd}$ for passing to the controller unit 21. Alternately, G and H can be calculated by an iterative convergent procedure. The parameters of $F_c$ and $P_c$ may be adjustable.

8 Claims, 3 Drawing Sheets

FIG.7 ions of the apparatus itself (such as slow response time of the rudder in turning to a desired position, and of the ship in turning in response to a rudder position change) and external influences (such as steady cross currents and varying wind forces). The control system (controller, actuators, and sensors) measures the desired quantity and generates a control signal which is fed into the system being controlled (as a control signal to the rudder position gear).

INDUSTRIAL CONTROL SYSTEMS

FIELD OF THE INVENTION

The present invention relates to industrial control systems.

BACKGROUND OF THE INVENTION

Industrial control systems are used to control a wide variety of industrial processes. Examples of such processes include the control of steel rolling mills (to maintain uniform output thickness of rolled steel strip), ship stabilization, dynamic ship positioning, adaptive ship autopilots, temperature control of buildings, radio aerial tracking, and a wide variety of chemical processes.

In all such processes, the problem in general terms is to maintain a desired quantity (such as the heading of a ship) constant (or following a desired pattern) in the face of peculiarities of the apparatus itself (such as slow response time of the rudder in turning to a desired position, and of the ship in turning in response to a rudder position change) and external influences (such as steady cross currents and varying wind forces). The control system (controller, actuators, and sensors) measures the desired quantity and generates a control signal which is fed into the system being controlled (as a control signal to the rudder position gear).

The controller can be regarded, in mathematical terms, as calculating the control signal as some function of the measured quantity. The particular function chosen can generally be regarded as a transfer function having a particular form (e.g. a polynomial of given degree) and having particular parameters (which would then be the coefficients of the various terms of the polynomial). The form of the function is chosen from a knowledge of the general characteristics of the system to be controlled. The parameters of the chosen form can then be determined in various ways, involving measurement or calculation of the characteristics of the system to be controlled.

In many control systems, the controller parameters are fully defined by the initial design, and the controller provides satisfactory control. However, in some systems, the operating conditions and/or system characteristics vary widely with time; for example, the characteristics of a cargo ship will differ widely depending on its speed, whether it is fully laden or in ballast, etc. In such circumstances, it may be desirable for the control system to be adaptive. For that, the characteristics of the system are monitored and the parameters of the controller are adjusted accordingly. Thus the control system does not merely calculate the control signal in dependence on the measured quantity; it also adapts itself to changes which are detected in the general characteristics or behaviour of the system being controlled by continual parameter adjustment.

One known controller design technique is known as H∞ (H-infinity) design. This has various advantages, but it has the drawback that the calculations involved in determining an H∞ controller in any particular instance are in general very complicated and involved. The H∞ method has therefore generally been used for the initial (off-line) design of controllers.

BRIEF SUMMARY OF THE INVENTION

The main purpose of the present invention is to provide a control system which is of the H∞ type (in a sense discussed in detail later) and which is sufficiently simple in the calculations involved for the controller calculations to be carried out in an on-line system. As explained above, such a system is an adaptive system, because the controller is being updated regularly.

Accordingly the present invention provides an industrial controller for controlling an industrial process, comprising a controller unit fed with a reference signal (r) and the output (y) of the process, a parameter estimator fed with the output (u) of the controller unit and the output (y) of the process and producing estimated polynomials A, B, and C, and a controller design unit fed with A, B, and C and feeding the controller unit with coefficients for implementing a polynomial ratio control function ($C_n/C_d$), characterized in that the controller design unit comprises means for storing two functions $F_c (=F_{cn}/F_{cd})$ and $P_c (=P_{cn}/P_{cd})$, means for calculating the unstable zeros $L_-$ of the function $L$ ($=P_{cn} F_{cd} B - F_{cn} P_{cd} A$), means for solving the matrix equations $$F A P_{cd} \lambda + L_- G = P_{cn} C F^* z^{-n}$$

$$F B F_{cd} \lambda - L_- H = F_{cn} C F^* z^{-n},$$

and means for calculating $C_n$ and $C_d$ as $G F_{cd}$ and $H P_{cd}$.

The equations may be solved either by an eigenvalue/eigenvector calculation or by F-iteration on the equations $$F A P_{cd} \lambda + L_- G = P_{cn} C$$

$$F B F_{cd} \lambda - L_- H = F_{cn} C$$

in which $F^*$ is calculated as the adjoint of F and the right-hand side of these equations are multiplied by $F^*$.

The parameters of the stored functions $P_c$ and $F_c$ may be adjustable.

LISTING OF DRAWINGS

Two embodiments of the present invention will now be described in detail, by way of example, with reference to the accompanying drawings in which.

INTRODUCTORY SUMMARY

The present invention provides an industrial control system which comprises a controller controlling an industrial process (such as a ship, a rolling mill, etc), the controlled variable of which is y. The controller and process outputs are fed to a parameter estimator which estimates the operating polynomials A, B, and C of the process. The operating polynomials are transfer functions (of the Laplace operator s if the control system is a continuous one, or of the unit delay operator $z^{-1}$ if the control system is a sampled one. A controller design unit processes the output of estimator to produce coefficients for the controller, which implements a polynomial ratio $C_n/C_d$.

The controller design unit implements an on-line H∞ algorithm which is based on minimizing a "square of sum" form of function $(P_c \cdot u(t) + F_c \cdot e(t))^2$. (This results in equations which are easier to solve than those arising from the usual "sum of squares" form of function.) A polynomial $$L = P_{cn} F_{cd} B - F_{cn} P_{cd} A$$

is defined, and the unstable factor $L_-$ is calculated.

The following polynomial equations arise from the optimization problem:

$$F A P_{cd} \lambda + L_- G = P_{cn} C F^* z^{-n}$$

$$F B F_{cd} \lambda - L_- H = F_{cn} C F^* z^{-n}.$$

These equations may be solved by the eigenvector-/eigenvalue technique. For this, the eigenvalue with the largest magnitude is extracted, the corresponding eigenvector is extracted, and $C_n$ and $C_d$ calculated as $G F_{cd}$ and $H P_{cd}$ for passing to the controller unit.

Instead of this, an iterative technique (the F-iteration technique) can be used, in which the equations $$F A P_{cd} \lambda + L_- G = P_{cn} C$$

$$F B F_{cd} \lambda - L_- H = F_{cn} C$$

are solved, $F^*$ (the adjoint of F) is calculated, the polynomials on the right-hand side of these equations are multiplied by this adjoint, and the procedure is iterated.

$F_c$ and $P_c$ are chosen so that $P_c$ dominates at low frequencies and $F_c$ at high frequencies. The parameters of $F_c$ and $P_c$ may be adjustable, and $P_c$ may be chosen to include a term which reduces the responsiveness of the system to disturbances in a frequency band in which noise is strong.

DETAILED DESCRIPTION

Figure 1:
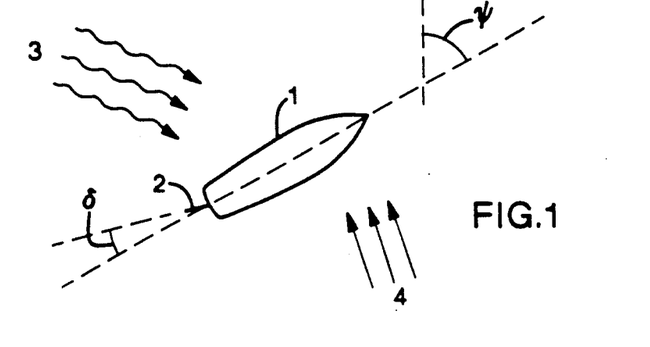
FIG. 1 is an idealized diagram of a ship.

FIG. 1 shows a ship 1 in idealized form. The ship's heading is measured as an angle $\psi$ (with respect to a fixed direction, such as true North), and the position of its rudder 2 is measured as an angle $\delta$ (with respect to the ship's long axis). The ship is subjected to various disturbing forces, such as a wave action (where the waves may be of a certain frequency and amplitude and travelling generally in a direction 3—all of course known only statistically) and wind action (where the wind direction 4, its strength, and its gustiness are also known only statistically). The object is to maintain a given heading, and this is to be achieved by a suitable control system.

Figure 2:
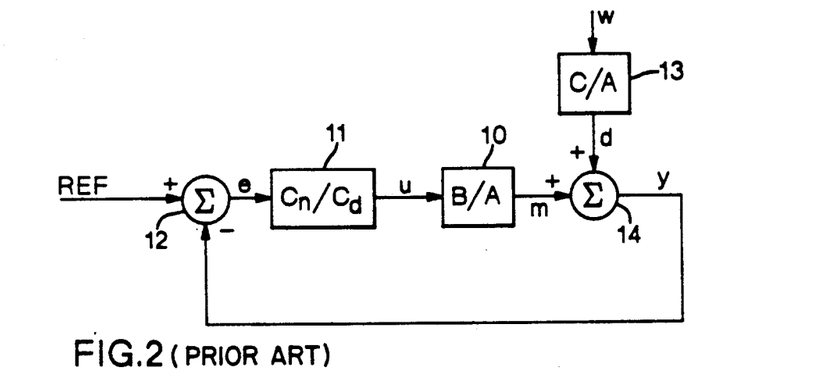
FIG. 2 is an abstract block diagram of the heading control system of the ship.

FIG. 2 shows the steering control system of the ship 1 in abstract form. The ship and its steering gear are indicated by a box 10, the desired heading is given as a signal REF, the signal fed to the ship and steering gear is shown as a signal u, and the actual heading is shown as a value y. Ignoring the blocks 13 and 14 for the moment, the actual ship heading y (taken for the moment as equal to the output signal m from the block 10) is measured and fed to a summing unit 12 which also receives the reference signal REF and produces the signal e which represents the "error" or difference between the desired and actual headings. This signal e is fed to the controller, represented by block 11, which produces a control signal u which is fed to the ship (block 10). (This particular representation of the process in terms of A, B, and C is known as the ARMA (Autoregressive movement average) model.)

The feedback loop through the summer 12 and controller 11 is negative, as indicated by the minus sign at 12 for the feedback signal path, in the sense that any small disturbance of the system is cancelled out so that the desired heading y is held constant. One form of "disturbance" is a change of the reference signal REF. It is desirable for the control system to cause the output y to change to follow the signal REF, and to cause this change to occur as fast as feasible, but to avoid excessively large swings and oscillation of the output y in the course of the change.

The entire system can be represented or modelled in various well known ways, of which the way just described in one. In many instances, the behaviour of the system being controlled can be represented by means of linear differential equations. Thus for the ship shown in FIG. 1, this approach would involve developing a set of differential equations which describe the operation of the ship. This process would start with an equation relating the angular acceleration (rate of change of angular velocity) of the ship, its angular velocity (rate of change of yaw), and the torque (dependent on the rudder angle and other hydrodynamic factors), thus:

$$\tau \ddot{\psi} + \dot{\psi} = \kappa \delta.$$

Further equations relating to the effects of wind and wave and various parameters would also be developed. (One important parameter is the ship velocity, affecting the values of $\kappa$ and $\tau$, since the turning effect of the rudder depends strongly on the ship velocity.)

It is conventional to take the Laplace transform of such equations; this yields what are known as transfer functions. Thus each of the two blocks 10 and 11 can be represented as a transfer function, and for present purposes a transfer function can be taken as the ratio of two polynomials. The transfer function for the block 10 is shown as A/B, where A and B are polynomials, and that for the block 11 is $C_n/C_d$, where $C_n$ and $C_d$ are polynomials forming the numerator and denominator respectively of the transfer function of block 11. (It should be noted that the $C_n$ and $C_d$ of block 11 are distinct from the C of block 13. $C_n$ and $C_d$ are computed by a controller design module in the controller, while C (or C/A) is determined by the nature of the system to be controlled.)

If the system is more naturally regarded as a sampled or discrete-time system, then its representation is by difference equations instead of differential equations. In such cases, it is conventional to take the z-transform of the equations; this is somewhat analogous to the Laplace transform, in that it yields functions which behave analogously to the transfer functions of continuous systems mentioned above and are described by the same term, transfer functions.

A complication which often occurs in practice is that the system may include sources of disturbance having characteristics which are not fully known. In the present example, the effect of crosswinds on the ship form such a source of disturbance. Such a disturbance can be represented as a noise source. Often the noise is not white, but is e.g. strongest in some particular frequency band; it is conventionally represented by a white noise signal w which is passed through a colouring filter 13 (which is a transfer function which can be chosen in the form C/A, to match the denominator of the transfer function of block 10) producing the actual wind noise signal d which is combined with the output m of the block 10 by a summer 14 to produce the actual heading signal y. Further disturbances can similarly be included by including further summers in series in the feedback path from the output of the ship 10 to the reference signal summer 12.

The general objective of the control system is, as noted above, to achieve "good" control of the system, in the light of the system characteristics (transfer function B/A) and the noise signals. This involves computing suitable polynomials $C_n$ and $C_d$.

One way of solving this problem involves a once-for-all calculation of the feedback transfer function. If the system being controlled has well-understood and relatively simple behaviour and noise effects are small, its transfer function can be calculated (using calculated moments of inertia, for example), and the optimal controller calculated. If the system being controlled is not understood too well or cannot have its transfer function calculated readily (for example, because the moment of inertia of a part with a complicated shape is required), then it may still be feasible to operate the system for an initial period during which its characteristics are measured, and an optimal controller for the system can then be calculated on the basis of those measurements.

If the system being controlled has a significant input noise disturbance, then the control transfer function is preferably chosen to minimize its effects, e.g. by producing a strong corrective action at the frequency band where the noise is concentrated (so as to compensate for the noise) but weaker action at other frequencies. The wind disturbance discussed above is input noise, i.e. noise arising "inside" the process being controlled; it is shown as entering the signal chain after the process 10 merely for convenience of analysis.

The system may also be subject to an output noise disturbance (not shown), which would act between the summer 14 and the controller block 11. Such a disturbance could arise for example from measurement errors in measuring the actual heading y, and would result in the signal fed to block 11 being different from the actual heading. The controller should be designed to neglect such output noise disturbance.

If the characteristics of the various noise signals are substantially constant, the once-for-all off-line design procedure may still be satisfactory.

The calculation of the optimal controller usually involves the minimization of a function, known as the "cost-function", which is a function of the system characteristics (including the controller transfer function) and a function defining the various features which are desired to be minimized (e.g. rapid response, low overshoot, good stability, etc) and their relative weights. The cost-function is discussed in more detail later.

One approach to optimal control is known as the H∞ technique, and involves a well known procedure of minimizing the supremum or maximum value of a frequency response which can be defined by system sensitivity and complementary sensitivity functions. The numerical computation of H∞ controllers is generally very difficult. Such controllers are therefore normally computed only by an off-line procedure.

In more complicated systems, the above off-line approach is not satisfactory. For example, in the case of the ship heading control system discussed above, the wind noise characteristics (amplitude and frequency spectrum) may vary considerably as a function of time, and similarly the ship characteristics will vary depending on its loading and speed. In such cases, some form of adaptive or self-tuning system is desirable. In such a system, the system parameters are calculated repeatedly on the basis of the immediate past history of the system (i.e. the values of the input and output signals of the system over a suitable period up to the current time). This process is known as system identification or parameter estimation. The controller transfer function is updated regularly on the basis of the calculated system parameters, and used to control the system.

It is important in such on-line adaptive systems for the parameter estimation and controller calculation algorithms to be reasonably simple and straightforward, with guaranteed convergence properties, in order that the control calculation is simple, reliable, and completely automatic.

A major problem with many self-tuning or adaptive techniques is that they are based on the assumption that the system being controlled can be represented by a relatively simple model—i.e. a model in which the two polynomials A and B are of relatively low order. This assumption is often false. Thus although the self-tuning system adapts to variations in the low-order approximation to the actual system being controlled, it does not take into account the fact that the model is only an approximation to the real plant.

One way of describing a system which is to be controlled is by means of a graph plotting the gain of the system against frequency. More specifically, the gain is shown as the Y co-ordinate against the frequency, plotted linearly along the X axis. The "gain" is the ratio (usually expressed in decibels) of the response of the system (measured as some suitable output quantity) to an input driving signal. (This form of description is commonplace for electrical systems such as amplifiers.) This type of description does not encompass all the properties of the system; for example, it fails to describe phase shifts (which are often shown as further curves on the same graphs.) However, gain graphs give a good general indication of the nature of the system.

Figure 4:
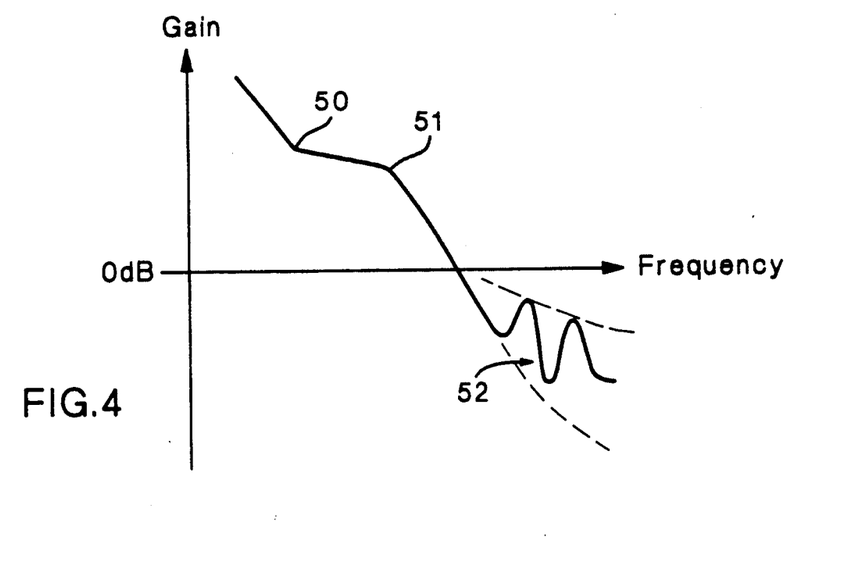
FIG. 4 is an idealized diagram of a steel rolling mill.
Figure 5:
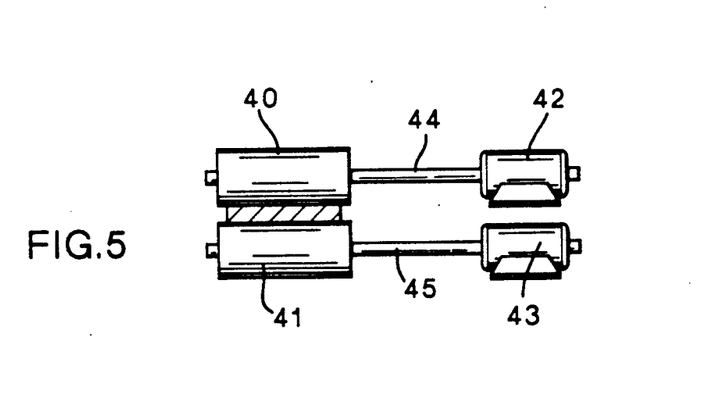
FIG. 5 is an idealized gain/frequency graph for the rolling mill.

FIG. 4 is a typical gain/frequency graph for an idealized steel rolling mill shown in FIG. 5. The mill consists of two rollers 40 and 41, between which steel strip is passed to be rolled to a desired thinness. Variations in such variables as the input thickness, temperature, and consistency of the steel strip and the speed of the rollers affect the output thickness, and the speed of the rollers can be adjusted accordingly. The rollers are driven by means of two motors 42 and 43, which are connected to the rollers 40 and 41 through shafts 44 and 45.

The response of the system to variations in the input (control) signal is strongly dependent on the frequency of the input signal change. This is because the system incorporates a number of inertias, such as the inertia of the rollers 40 and 41 and the inertia of the steel strip being rolled. The gain/frequency graph therefore generally slopes downwards to the right, as shown. The curve has various points at which its slope changes, such as points 50 and 51; these points correspond to corresponding linear factors in the transfer function polynomials A and B.

The low frequency response can be modelled reasonably well, from a knowledge of the mechanics of the system (i.e. a knowledge of the various inertias, etc.). Such modelling will in general not be perfect, because some properties of the system will not be known accurately; for example, the inertia and consistency of the steel strip being rolled will vary from strip to strip. These uncertainties can be described as parameter uncertainties, since the details of the model will depend on such parameters as the inertia and consistency of the steel strip being rolled. Such parameter uncertainties can be dealt with by using an adaptive control system.

FIG. 4 also shows some high frequency variations 52 in the response graph. These variations are due to such matters as resonances of the roller-40/shaft-44/motor-42 and roller-41/shaft-45/motor-43 combinations. (The motors 42 and 43 are normally housed in an enclosure at some substantial distance from the rollers 40 and 41, so the shafts 44 and 45 are of substantial length, and such resonances are therefore substantial.) Although the occurrence of such high frequency features can be expected, it is often impracticable to attempt to model them, because their precise nature may not be calculable in practice; they may be termed unmodelled dynamics or unstructured uncertainties.

Such high frequency features can often be ignored; as a general rule, they will not rise up as far as the 0 dB gain level, and ignoring effects below that level will not have disastrous effects. However, it is possible for such effects to approach the 0 dB level. Hence it is desirable to have a controller which is robust in the presence of such uncertainties. It is not feasible to do this by adaptive techniques. Instead, such compensation can be achieved by $H\infty$ techniques. It is therefore often advantageous to apply both adaptive techniques and the $H\infty$ technique to a given single control system, since the two techniques affect separate aspects of the system: adaptive techniques perform parameter adjustment of low-frequency modelled features while $H\infty$ techniques compensate for unmodelled high-frequency features.

The $H\infty$ technique mentioned above allows for uncertainties in system description. However, this technique has hitherto been used only for designing fixed (off-line) controllers. One important reason for this is that, as noted above, the calculations involved in using the $H\infty$ technique are very complicated, and cannot conveniently be utilized in an adaptive or self-tuning system.

In the present invention, the two design approaches are combined. This results in the best features of a self-tuning system being combined with those of an $H\infty$ design. Thus the present invention provides a self-tuning controller which identifies a low-order approximation to the system being controlled but which takes into account the modelling uncertainties in the approximation. The resulting system combines the adaptiveness of self-tuning with the robustness and frequency response shaping provided by the $H\infty$ technique.

Considering robustness in more detail, it is known that this can be improved in fixed (non-adaptive) controllers by an appropriate choice of frequency dependent cost function weightings. This characteristic can be maintained in the present invention. For example, good sensitivity characteristics at low frequency can be achieved by introducing an integrator in the cost function on the error term. This ensures that the controller has high gain at low frequency, to ensure that the system tracks low frequency reference signal changes closely and also minimizes the effect of low frequency input disturbances. The cost function weightings can also be chosen to minimize the effect of high frequency dynamics which are not adequately represented in the model, and which are a source of instability in known self-tuning controllers. Known self-tuning controllers simply minimize a least-squares cost function; while this is good for disturbance rejection, it has adverse effects on robustness.

A further problem with existing self-tuning controllers is that most of them have poor performance with non-minimum phase systems. A minimum phase system is one in which the transfer function polynomials have no factors with positive real parts, and the model normally involves this assumption. But many actual systems are not minimum phase systems; in particular, systems involving sampling often behave as non-minimum phase systems. This results in poor performance of existing self-tuning controllers when applied to such systems.

The techniques of the present invention can also in principle be enlarged for very complex systems, including multi-loop systems and multi-variable systems.

Figure 3:
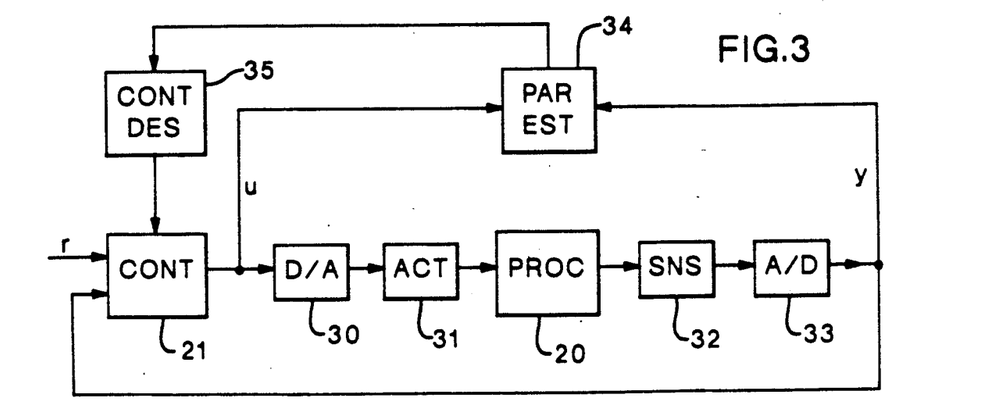
FIG. 3 is a more detailed diagram of a control system embodying the invention.

FIG. 3 shows a control system, such as the system of FIG. 2, in a more detailed form. Block 20 represents the process being controlled, and corresponds to block 10; unit 21 represents the controller, and corresponds to block 11 together with the summer 12 of FIG. 2. (The controller 11 of FIG. 2 can be located in the path between the summer 12 and the process block 10 instead of where shown. Such a change of location is not of great significance; there are well-known techniques for converting the transfer function for the controller from the form suitable for either location to a form suitable for the other, and the two forms have generally equivalent characteristics.) Noise sources are not shown in FIG. 3, although they will of course normally be present.

Block 20, the process, is fed from unit 21, the controller, via a digital-to-analog converter 30 and an actuator 31, which controls the physical variable of the process—e.g. the position of a rudder. The output of block 20 is another physical variable—e.g. a ship heading—and this is measured by means of a sensor 32 and converted to digital form by an analog-to-digital converter 33.

The controller unit 21 performs a simple control function which applies the transfer function $C_n/C_d$ to the difference e between the feedback signal y and the demand signal r (signal REF of FIG. 2). This transfer function is not fixed but is constantly updated. The control is achieved by a two-stage process. The control signal u from the controller 21 to the process 22 and the process output variable signal y from the process 20 are fed to a parameter estimation unit 34, and the parameters estimated in unit 34 are fed to a controller design unit 35, which uses them to "design" the controller 21—i.e. continuously update the two polynomials $C_n$ and $C_d$ of the controller unit 21.

The estimation unit 34 utilizes known principles, as does the controller unit 21. It is known to provide, between these two units, a controller design unit which incorporates a controller calculation algorithm. Examples of such algorithms are LQG (Linear Quadratic Gaussian) algorithms, minimum variance algorithms, etc. (An $H\infty$ controller is somewhat similar to an LQG one, but the LQG controller minimizes the average deviation of the error over frequency, while an $H\infty$ one minimizes the maximum deviation of error over frequency. The $H\infty$ closed loop system is therefore more robust, i.e. less liable to result in oscillations.) It is in unit 35 of the present system that the $H\infty$ type calculations are performed.

The estimator unit 34 receives, at each sample instant, the value of u calculated on the previous sample instant (or possibly two or more sample instants previously, depending on the delay in the plant) and the current measured value of y. Using the data received at each sample instant, the estimation unit uses a recursive method to build up a transfer function representation of the system—that is, to identify the plant parameters or polynomials A, B, and C. The estimation unit may be preset with initial values for these functions to use on start-up, to minimize the time required for the estimated values to converge to a reasonable approximation of the actual values.

The estimator has just been described in terms of a sampling system, and the following description is also primarily in terms of a sampling system and the unit delay operator z (or $z^{-1}$). As noted above, however, the same principles can be utilized with little change in a continuously-operating system and using the Laplace operator s.

The fundamental purpose of the control system is to cause the process variable y to follow the demand signal r. The tracking error e(t) is the difference between these two signals, and the minimization of this tracking error is therefore a fundamental desideratum. However, it is also desirable to minimize the control action u(t) which is required to achieve the tracking of the process being controlled to follow the demand signal. This is because if the control action is large, stability can be adversely affected and the physical demands on the actuator 31 and the plant in which the process is being carried out can become excessive. There is thus a conflict between these two desiderata. To achieve a satisfactory balance between these two conflicting desiderata, a function to which both signals contribute is therefore selected and minimized. This function is normally defined, in H∞ controllers, by using a first weighting function $P_c$ for the weighting of the error signal and a second weighting function $F_c$ for weighting the demand signal.

The operation and function of substantially any controller can be described in mathematical terminology. In particular, the operation and function of the present controller can be described in terms of the equations $$F \, A \, P_{cd} \, \lambda + L_- G = P_{cn} \, C \, F^* \, z^{-n}$$

$$F \, B \, F_{cd} \, \lambda - L_- H = F_{cn} \, C \, F^* \, z^{-n}$$

The present controller can be regarded as determining the minimal degree solution of these equations.

In these equations, $P_{cn}$ and $P_{cd}$ are the numerator and denominator of a function $P_c$, $F_{cn}$ and $F_{cd}$ are the numerator and denominator of a function $F_c$, and F and $F^*$ are adjoint functions (i.e. $F(z^{-1})=F^*(z)$). n (or more explicitly $n_f$) is the degree of F; the polynomials on the left-hand sides are in powers of $z^{-1}$, and the multiplicative factor $z^{-n}$ is required to ensure that the right-hand sides are also in powers of $z^{-1}$ rather than of z. $L_-$ is obtained from a polynomial L which is defined by $$L = P_{cn} \, F_{cd} \, B - F_{cn} \, P_{cd} \, A.$$

This polynomial is of course factorizable into a set of linear factors of the form z - α, where the α's can be real or complex (the complex roots (zeros) occur, of course, in conjugate pairs). The α's are the zeros of the polynomial, and are termed unstable or stable according to their moduli are or are not greater than 1. (That is, an α is an unstable zero if $|\alpha|>1$.) $L_-$ is the product of all unstable factors of L, i.e. the factors with unstable zeros.

A, B, and C are of course the polynomials discussed above. The manner in which the functions $P_c$ and $F_c$ are chosen is discussed below. It should be noted that $F_c$ is distinct from F.

The present controller can be described in mathematical terms as: (a) solving these equations by determining the unknowns λ (which is a scalar) and F, G, and H (which are polynomials of minimum degree in z), and; (b) from this solution, determining the transfer function $C_n/C_d=(G \, F_{cd})/(H \, P_{cd})$. This transfer function is implemented by the present system.

The plant is assumed to be linear. The conditions of this assumed linear plant may change, either because the plant is in fact non-linear and its operating point changes or because there are changes in its load or other operating conditions. The model estimated will change correspondingly, and the controller will be recalculated accordingly. Thus the adaptation takes place continuously, and so the present system provides a self-tuning controller.

In the present system, there are two different ways in which these equations may be solved. One is the eigenvector-eigenvalue method, and the other is the F-iteration method.

In the eigenvector-eigenvalue method, the two equations are written in matrix form $$\begin{bmatrix} t'(P_{cn}C) & -t(L) & 0 \\ t'(F_{cn}C) & 0 & -t(L) \end{bmatrix} \begin{bmatrix} F \\ G \\ H \end{bmatrix} - \lambda \begin{bmatrix} t(AP_{cd})00 \\ t(BF_{cd})00 \end{bmatrix} \begin{bmatrix} F \\ G \\ H \end{bmatrix} = 0$$

Each of the polynomials F, G, and H is converted into vector form by having its coefficients written in a column, and the three columns are written one above the other in the second matrix of each product in the equation. The polynomials $P_{cn}$ C etc (which are, of course, each a product of two polynomials) are converted into matrix form by being written as Toeplitz matrices.

The Toeplitz matrix t(X) of a polynomial X is a matrix with the first column formed by writing the coefficients of X downwards (starting with the lowest order (constant) coefficient), and each successive column shifted downwards one step relative to the previous column, the number of columns being determined by the number of rows in the matrix which the Toeplitz matrix is being multiplied by; spaces above (for all but the first column) and below (for all but the last column) the coefficients are filled with 0's. The Toeplitz matrix t'(X) is a matrix like t(X) but reflected in a vertical axis (for the discrete case, using the unit delay operator z) or with every element α in all even-numbered columns being replaced by its complement −α (for the continuous case, using the Laplace operator s). That is, the Toeplitz matrices are $$t(A) = \begin{bmatrix} a_0 & 0 & \cdots & & 0 & 0 \\ a_1 & a_0 & \cdots & & & 0 \\ a_2 & a_1 & a_0 & & & \\ \cdot & \cdot & \cdot & & & \\ \cdot & \cdot & \cdot & & & \\ \cdot & \cdot & \cdot & & & \\ 0 & \cdots & & & & \\ 0 & 0 & & & & \\ 0 & 0 & 0 & \cdots & & a_n \end{bmatrix}$$

$$t'(A) = \begin{bmatrix} 0 & 0 & \ldots & & 0 & a_0 \\ 0 & & \ldots & & a_0 & a_1 \\ & & a_0 & a_1 & a_2 & \\ & & \cdot & \cdot & \cdot & \\ & & \cdot & \cdot & \cdot & \\ & \ddots & & & & 0 \\ & \ldots & & & 0 & 0 \\ a_n & & \ldots & 0 & 0 & 0 \end{bmatrix}$$

$$t'(A) = \begin{bmatrix} a_0 & 0 & \ldots & & 0 & 0 \\ a_1 & -a_0 & \ldots & & & 0 \\ a_2 & -a_1 & a_0 & & & \\ \cdot & \cdot & \cdot & & & \\ \cdot & \cdot & \cdot & & & \\ 0 & \ldots & & & & \\ 0 & 0 & \ldots & & & \\ 0 & 0 & 0 & \ldots & & \pm a_n \end{bmatrix}$$

for the three matrices respectively.

This matrix equation is in the form $$(Q - \lambda R) S = 0$$

where Q and R are konw matrices, S is an unknown vector, and $\lambda$ is an unknown scalar. This matrix equation is known as the generalized eigen problem, which is a well-known problem in linear algebra. The matrices Q and R are square matrixes of size $n \times n$, and S is a column matrix corresponding to the polynomials F, G, and H. This equation yields n solutions for $\lambda$ and S. In the present system, it is necessary to choose the solution which yields a stable control system. This is achieved by choosing a solution with an extreme value of $\lambda$—either the minimum or the maximum, depending on the formulation of the eigen problem. Once the equation has been solved and the polynomials F, G, and H found, the transfer function $C_n/C_d$ is calculated as noted above, and this transfer function is passed from unit 35 to unit 21.

Any method of solving the eigen problem can be used. Certain known methods of solving the eigen problem, such as the QZ method, have the characteristic of operating in two stages, the first stage being the determination of the eigenvalues and the second being the determination of the corresponding eigenvectors. In using such a method, the eigenvalues would first be calculated, the extreme one chosen, and then the corresponding eigenvector calculated.

Such a method allows a refinement, since the method allows the calculation of eigenvalues only. For this refinement, the system monitors the way the value of the chosen eigenvalue changes, and calculates the corresponding eigenvector only if the eigenvalue changes significantly. This reduces the average calculation load, enabling the system to follow the eigenvalue more closely during periods when it is changing only slowly. Alternatively, the system can be used for unrelated background processing during such periods.

In the F-iteration method, the $H\infty$ two equations above are solved by solving a series of similar but simpler equations. The simpler equations are $$F A P_{cd} \lambda + L_- G = P_{cn} C$$

$$F B F_{cd} \lambda - L_- H = F_{cn} C$$

These are in fact the LQG equations, which represent the LQG controller for the same system; as with the $H\infty$ problem, the LQG controller is given by the transfer function $(H\ P_{cd})^{-1}\ (G\ F_{cd})$. In matrix form, these equations can be written as $$\begin{bmatrix} A P_{cd} t(L_-) & 0 \\ B F_{cd} & 0 & -t(L_-) \end{bmatrix} \begin{bmatrix} FA \\ G \\ H \end{bmatrix} = \begin{bmatrix} P_{cn} C \\ F_{cn} C \end{bmatrix}$$

This equation is in the form Q R = S, which is a straightforward system of linear equations, in which Q and S are real matrices and R is a real vector, and the unknowns are the elements of R. This system of equations may be readily solved by any of a variety of well-known techniques. When R has been found, i.e. the polynomials F, G, and H are found, then F*, the adjoint of F, is calculated. The polynomials on the right-hand side of these equations are multiplied by this adjoint—i.e. the right-hand sides of the equations are replaced by the products $P_{cn}$ C F* and $F_{cn}$ C F*. The equations are re-solved, and the process is iterated. It can be shown that the iteration converges to a solution of the equations given above.

In practice, in a sampling system the number of iterations performed during each sampling period may be any number from 1 upwards. If the number of iterations is large enough, then a "pure" $H\infty$ controller of the above type is implemented. If the number of iterations is small, then the controller is a mixed controller with LQG characteristics as well as the characteristics of the above type, but is always converging towards a pure controller of the above type; its LQG content will be the result of only recent changes in the plant being controlled, and will always decay to nothing if the plant conditions remain stable.

Figure 7:
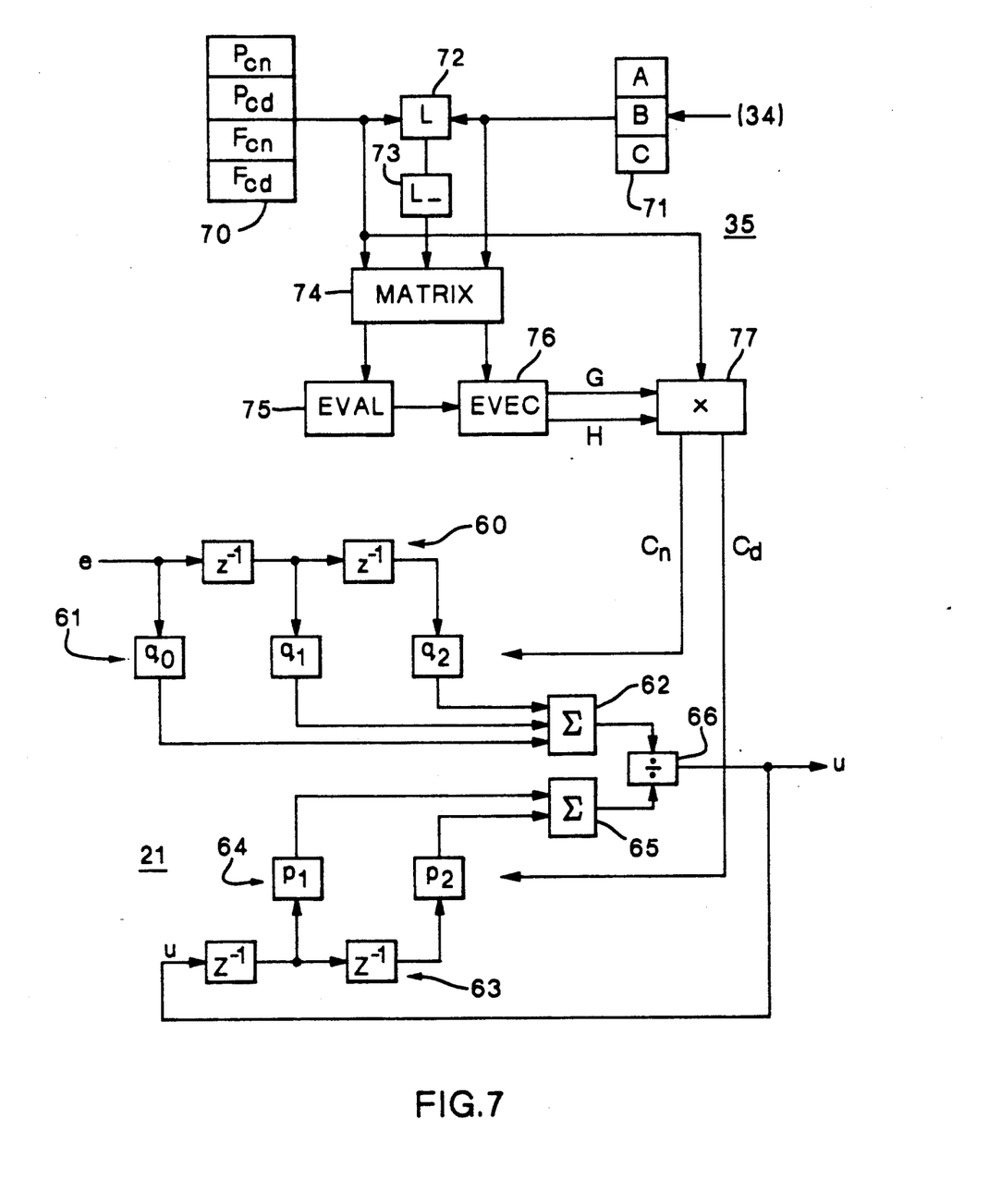
FIG. 7 is a more detailed block diagram of parts of the FIG. 3 system.

FIG. 7 is a more detailed block diagram of the present controller, showing the details of blocks 21 and 35 of FIG. 3. The components of a sampled or discrete system are shown.

Considering first the controller, block 21, this implements the equation $$u = (C_n/C_d) \cdot e.$$

$C_n$ and $C_d$ are polynomials in $z^{-1}$, say $$C_n = q_0 + q_1 \cdot z^{-1} + q_2 \cdot z^{-2},$$

$$C_d = p_0 + p_1 \cdot z^{-1} + p_2 \cdot z^{-2}.$$

Inserting these into the original equation and rearranging it to obtain u gives $$p_0 \cdot u = [(q_0 + q_1 \cdot z^{-1} + q_2 \cdot z^{-2}) \cdot e]/[(p_1 \cdot z^{-1} + p_2 \cdot z^{-2}) \cdot u].$$

This gives the present value of u in terms of the present and past values of e and the past values of u. This is implemented by means of the circuitry 60–66. The signal e is fed to a chain of unit delay circuits 60, whose outputs are fed through a series of scaling circuits 61 which multiply the various e values by the q coefficients to an adder circuit 62. Similarly, the signal u is fed to a chain of unit delay circuits 63, whose outputs are fed through a series of scaling circuits 61 which multiply the various u values by the p coefficients to an adder circuit 65. The outputs of the adders 62 and 65 are fed to a division circuit 66, which produces the signal u by dividing the output of adder 62 by the output of adder 66.

It will be noted that there is no scaling circuit for the undelayed u signal, as this undelayed signal does not appear on the right-hand side of the equation for u. Further, it is assumed that the coefficients have been scaled so that $p_o=1$; this can readily be achieved in the calculation of these coefficients. The scaling circuits 61 and 64 are adjustable or programmable to operate with varying scaling factors; as will be seen, the p and q coefficients are supplied by block 35 and are variable.

The function of the parameter estimation unit 34 is to generate the polynomials A, B, and C which were discussed with reference to FIG. 2. This estimation is performed in a known manner, as described for example in L Ljung and T Söderström, "Theory and Practice of Recursive Identification", MIT Press, London, 1983. More precisely, the (maximum) orders of these polynomials are chosen by the designer, and unit 34 generates estimated values for their coefficients. This is performed recursively, using a set of equations which update the current estimated set of polynomials, i.e. sets of coefficients $a_m$, $b_m$, and $c_m$, by adding a set of correcting values which are calculated to minimize a prediction error. The prediction error is closely related to the "residual", which is the value of the noise signal as determined by the estimated polynomials, the known past values of the signals u and y, and the estimated past values of the signal w (FIG. 2). Estimated values of the noise signal have to be used because the actual values cannot be measured directly; the values have to be obtained by calculation, and the calculation involves using previously estimated values. The estimation algorithm includes a "memory length" or "forgetting factor" parameter which determines how many past values of the variables are required by the algorithm.

The controller design unit 35 receives the estimated polynomials A, B, and C (that is, the coefficients of these polynomials) from unit 34. It also has built into itself a pair of weighting functions $P_c$ and $F_c$ (each in the form of numerator and denominator polynomials). From these, it calculates the polynomials $C_n$ and $C_d$, i.e. the coefficients of these functions (the p's and q's), and passes these coefficients to the controller unit 21, where they are used to set the weights of the weighting units 61 and 64.

In more detail, the unit 35 has a store 70 containing the polynomials $P_{cn}$, $P_{cd}$, $F_{cn}$, and $F_{cd}$, and a set of input ports 71 at which the polynomials A, B, and C appear. (All polynomials are in the form of sets of coefficients.) The store 70 and ports 71 feed a multiplier 72 which calculates the polynomial L, in accordance with the equations above. This feeds a factorizing and dividing unit 73, in which the factors of L are determined in a well-known manner (the numerical extraction of factors from polynomials is conventional). The factors (which are in general complex) are classified according to whether or not their moduli are greater than 1, and unit 73 divides out from L those factors with moduli less than 1, leaving a reduced polynomial L_ including all factors with zeros whose moduli are greater than 1. (An analogous situation arises in the continuous-time case.)

The polynomials from memory 70, ports 71, and unit 73 are fed to a matrix unit 74, which combines them into the two matrices in the matrix equation above. This unit is coupled to an eigenvector extraction unit 75, which extracts the eigenvectors $\lambda$ and determines the largest eigenvalue. The largest eigenvalue is passed to an eigenvector unit 76 which determines the corresponding eigenvector from the matrix equation held in unit 74. This eigenvector incorporates the two vectors G and H, and these are passed to a multiplier unit 77 where they are multiplied by the polynomials $F_{cd}$ and $P_{cd}$ to produce the polynomials $C_n$ and $C_d$, which are passed to the controller unit 21.

If the F-iteration method is used, then the matrix unit 74 generates the simpler matrix equation discussed above, and the eigenvalue unit 75 and eigenvector unit 76 are replaced by a linear equation unit which generates the polynomial F*, the adjoint function discussed above, which is fed back to the matrix unit 74 to produce an iteration of the F equations, as discussed above, and iteration proceeds as also discussed above. The linear equation unit also produces the polynomials G and H at each iteration, and after the iteration has been completed, these polynomials are fed to unit 77 as before.

The various calculations and manipulations of information may be performed by means of distinct circuit elements as illustrated, or to any convenient extent by means of computer means which is suitably programmed to simulate the blocks and functions shown.

Depending on the particular application, there may be several iterations per sampling period, a single iteration per sampling period, or even several sampling periods per iteration. The number of iterations per sampling period will normally be fixed. However, there may be circumstances in which the number is variable. For example, if the conditions of the system normally change only slowly but there are easily recognized situations in which they are known to change rapidly, it may be appropriate for the number of iterations per sampling period to be increased temporarily in such conditions.

It may be noted that depending on how elaborate the model of the system is, the number of equations is not necessarily two. For example, if a more general model with more than one noise input is assumed, there may be three equations.

The present invention is a form of $H\infty$ controller, which is defined in the following way. The basic principle of the $H\infty$ controller is that an optimal control criterion is minimized and is expressed in terms of a cost function J defined as:

$$J = \sup_{|z|=1} (X)$$

where sup over $|z|=1$ represents the mathematical supremum over all frequencies, and is the norm associated with the $H\infty$ normed space of complex functions. The function X is a cost index, the cost function of which is to be minimized.

The function X depends on the feedback controller. There is therefore some controller which minimizes X such that X has a constant value over all frequencies. In this case, the controller is an $H\infty$ controller and is unique, since there is only one controller which minimizes the cost function.

It can be shown that the present system represents a minimization of a function X which is the power spectrum of a weighted sum of the tracking error e (=r−v) and the controller output signal u, as follows:

X=power spectrum of $(P_c(z^{-1}) e(t) + F_c(z^{-1}) u(t))$ where $P_c$ and $F_c$ are defined in the same way as in the standard H∞ system. This function is a "square of sum" function, in contrast to the more usual "sum of squares" function employed in both LQG (Linear Quadratic Gaussian) systems and standard H∞ systems.

In more detail, when an optimal control strategy is being devised, some mathematical criterion which represents a "cost" is chosen, and this "cost" must then be minimized. For example, if we are concerned with a motor vehicle, we might choose the "cost" as the quantity of fuel used in a given period of time. This will be high for very low speeds (because of the low gearing and high engine speed) and for very high speeds (because of engine losses at high revs and wind resistance). So there will be some speed at which the fuel used in the given time is a minimum; this is then the optimal speed, and the corresponding fuel consumption is the optimal fuel consumption. The principle of the optimal feedback controller calculation is then analogous to taking any car and, from its specification, calculating the speed at which the petrol consumption is a minimum.

To return to the optimal feedback control system described earlier, it is convenient to choose, as a cost-function, a function of the tracking error e and the control signal u. It is desirable to minimize both these quantities. Minimization of the tracking error is desirable for obvious reasons, and minimization of the control signal is desirable so as to minimize the size of actuators required and their power consumption.

The general form of the cost-function is then:

$$J = \int_0^T F(e(t), u(t)) dt$$

where F is the cost index, and e and u are dependent on the controller. There will be one (or possibly more than one) controller which minimizes J; this is the optimal controller. F (which is here a function, distinct from both the polynomial F and the function $F_c$) is selected such that a desired criterion which involves e and u is minimized.

The principal form of the cost-function is a sum of squares function, in which the cost index being minimized is a sum of squares of the variables - in this case e and u. Thus this cost-function is typically $$J_1 = \int_0^T (P_c \cdot e^2 + F_c \cdot u^2) dt$$

This is analogous to the familiar use of a mean square function in such matters as obtaining a measure of the magnitude of an oscillatory signal (where the square root of the mean square is in fact used) and the problem in statistics of finding the "best fit" line to a set of 2-dimensional co-ordinates which are subject to experimental error.

The present invention uses a cost-function which is, like the sum of squares function, a quadratic function, but differs from the sum of squares function is a significant respect. The present cost-function is a square of sum function. This is defined as $$J_2 = \int_0^T (P_c \cdot e + F_c \cdot u)^2 dt$$

The use of this second kind of cost-function can lead to simplifications in the solution of the H∞ optimization problem.

Such cost functions, including in particular the sum of squares function and the square of sum function, may be transformed into the frequency domain. The required minimization is thereby transformed from minimizing a function over a time interval to minimizing a function over frequency. What is being considered is the frequency spectrum or, more precisely, the signal spectral densities which define the power of the signal over frequency.

Such a transformation can conveniently be done by using the same general technique as was discussed earlier for transforming the differential equations describing the behaviour of a system into transfer functions; that is, by using the Laplace transfer function (if continuous variables are being used) or the corresponding discrete operator $z^{-1}$ (if the system is a sampled or discrete-interval one). Such a transformation converts the above functions into the following forms respectively:

$$J_3 = (\tfrac{1}{2}\pi j) \oint_{|z|=1} [P_c \Phi_{\phi\phi}(z^{-1}) + F_c \Phi_{uu}(z^{-1})] dz/z,$$

$$J_4 = (\tfrac{1}{2}\pi j) \oint_{|z|=1} \Phi_{\phi\phi}(z^{-1}) dz/z$$

where $\Phi_{\phi\phi}(z^{-1})$ is the spectral density of $\phi(t) = P_c \cdot e(t) + F_c \cdot u(t)$.

It can be shown that the minimization of the function $J_4$, which is the function associated with the present system, can be achieved by solving the two equations in F, G, and H given and discussed above. This is in contrast to the minimization of the function $J_3$ (or $J_1$), which is a much more difficult problem both in abstract mathematical terms and in practice.

A cost-function which can be represented by a "sum of square" function appears at first sight to be seriously deficient. This is because one way in which the sum $P_c(z^{-1}) e(t) + F_c(z^{-1}) u(t)$ can be minimized is obviously for the two parts $P_c(z^{-1}) e(t)$ and $F_c(z^{-1}) u(t)$ to be equal and opposite, and this appears to set no constraint on the values of e(t) and u(t) individually. Thus the value of the error signal e(t) is apparently uncontrolled, while the whole purpose of the control system is to minimize this signal.

Figure 6:
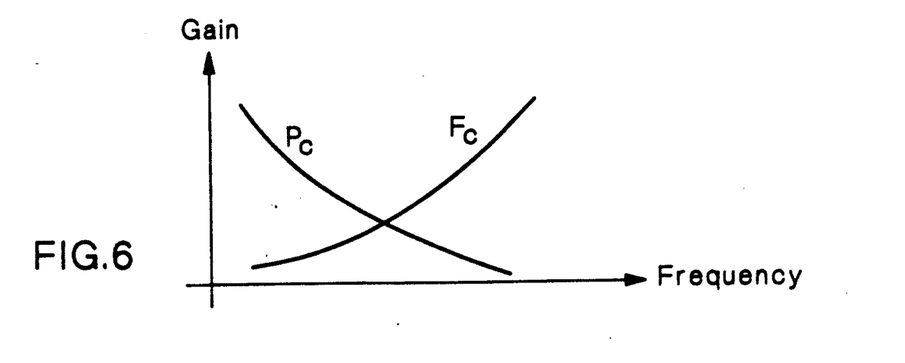
FIG. 6 is an idealized gain/frequency graph illustrating a cost function.

This deficiency is, however, far less significant than would appear from the above consideration, for the following reason. The functions $P_c$ and $F_c$ are, of course, frequency sensitive, and in practice they are chosen so that $P_c$ dominates at low frequencies and $F_c$ dominates at high frequencies, as indicated informally by FIG. 6. It can thus be seen from the above formula for the power spectrum X that the two terms can interact in the undesirable manner discussed above over only a relatively small and unimportant part of the whole frequency range.

The general requirement on $P_c$ and $F_c$ is therefore that $P_c$ should be much larger than $F_c$ at low frequencies and vice versa at high frequencies. A simple example of the manner in which this can be achieved is to take $P_c$ and $F_c$ as $$P_c = (1 - \alpha \cdot z^{-1})/(1 - I \cdot z^{-1}),$$

$$F_c = \beta.$$

Here we can for the moment take $\alpha = 0$, $\beta = 1$, and $I = 1$. (In practice, a function for $F_c$ which increases with frequency would be chosen, but the above general condition is satisfied by this very simple form of function for $F_c$.) The frequency range from 0 to $\infty$ corresponds to a variation of z from 1 to $-1$ anticlockwise around the unit circle from 1 to $-1$ in the complex plane. A large value of $\alpha$ (i.e. close to 1) results in good steady state control and small control signals but sluggish response.

The given form of $P_c$ becomes indefinitely large for zero frequency ($z = -1$); it can be limited to a large but finite value by taking I as slightly less than 1. The parameter I represents integral action; $I = 1$ represents full integral action, $I = 0$ represents none.

In many known $H_\infty$ systems, the control law tends to become constant at high frequencies. The controller may therefore fail to cope adequately with high frequency disturbances. The simple choice of $F_c$ above has this disadvantage. However, if the system being controlled is such that this disadvantage is significant, then $F_c$ can easily be chosen in the present system to avoid this disadvantage. For example, $F_c$ can be chosen as $$F_c = \beta \cdot (1 - z^{-1})/(1 + z^{-1}).$$

Further, shaping of the response can be achieved. For example, with the ship model discussed above, it is desirable for the system to ignore wave action, i.e. for its response to disturbances in the frequency band of waves to be reduced. This can be achieved by choosing $F_c$ to be high in that frequency band. If the system is a continuous-time one using the Laplace operator s, a standard form for this is $$F_c = (\beta \omega_n^2 s)/(s^2 + 2 \omega_n s + \omega_n^2).$$

A corresponding form in terms of $z^{-1}$ can be obtained by a conventional transformation from this form, e.g. by a bilinear transformation. A similar result can be achieved by choosing $P_c$ to be low for the relevant frequency band.

The present system in fact results in desirable system properties and a relatively simple control calculation procedure. The system properties are scarcely distinguishable from those of a conventional $H_\infty$ control system. The control calculation procedure implemented by the present system is, however, much simpler than that required by a conventional $H_\infty$ system. The present system is therefore able to operate adaptively.

We claim:

1. An industrial controller for controlling an industrial process, comprising:
   a controller unit for receiving a reference signal and the output of the industrial process;
   a parameter estimator fed with an output of the controller unit and the output of the industrial process for producing estimated polynomial functions A, B and C which are polynomial functions indicative of said process in the ARMA model; and
   a controller design unit to which the estimated polynomial functions A, B and C are fed and which feeds the controller unit with coefficients for implementing a polynomial ratio control function $C_n/C_d$ the controller design unit comprising:
   means for storing two polynomial ratio functions $F_c$ ($=F_{cn}/F_{cd}$) and $P_c$ ($=P_{cn}/P_{cd}$);
   means for calculating a polynomial function ($P_{cn} F_{cd} B - F_{cn} P_{cd} A$) = L, and unstable zero functions L_ thereof;
   means for determining polynomials F, G and H by solving the matrix equations $$F A P_{cd} \lambda + L\_G = P_{cn} C F^* z^{-n}$$

$$F B F_{cd} \lambda - L\_H = F_{cn} C F^* z^{-n}$$

where $F^*$ is the adjoint of F, and $\lambda$ is a scaler, and means for calculating the polynomial functions $C_n$ as $G F_{cd}$ and $C_d$ as $H P_{cd}$ respectively.

2. An industrial controller according to claim 1, wherein the means for solving the matrix equations comprise means for determining their extreme eigenvalue and means for determining the associated eigenvector.

3. An industrial controller according to claim 2, including means for detecting changes in the extreme eigenvalue and causing the means for determining the eigenvector to operate only when the eigenvalue changes.

4. An industrial controller according to claim 1, wherein the means for solving the matrix equations comprise means for iteratively:
   (a) solving the equations $$F A P_{cd} \lambda + L G = P_{cn} C.$$

$$F A F_{cd} \lambda - L H = F_{cn} C;$$

and
   (b) multiplying the right-hand side of these equations

5. An industrial controller according to claim 1, wherein the means for storing the functions $P_c$ and $F_c$ comprise means for adjusting the parameters of those functions.

6. An industrial controller according to claim 1, wherein the functions stored in the means for storing the store functions are;

$$P_c = (1 - \alpha \cdot z^{-1})/(1 - I \cdot z^{-1})$$

and $$F_c + \beta$$

where $z^{-1}$ is the unit delay operator.

7. An industrial controller according to claim 1, wherein the functions stored in the means for storing the stored functions are:

$$P_c = (1 - \alpha \cdot z^{-1})/(1 - I \cdot z^{-1})$$

and $$F_c + \beta(1 - z^{-1})/(1 + z^{-1}),$$

wherein $z^{-1}$ is the unit delay operator.

8. An industrial controller according to claim 1, wherein the means for storing the stored functions store a term of the form $(\beta w_n^2 s)/(s^2 + 2(w_n s + w_n^2)$ for a continuous system and the corresponding form in terms of $z^{-1}$ as a term of the $F_c$ function for a sampled system where $z^{-1}$ is the unit delay operator and s is the Laplace operator.

* * * * *